Patented Oct. 25, 1932

1,884,300

UNITED STATES PATENT OFFICE

OGDEN S. SELLS, OF SAN FRANCISCO, CALIFORNIA, ASSIGNOR TO SPRAGUE-SELLS CORPORATION, OF HOOPESTON, ILLINOIS

METHOD OF PROCESSING CORN

No Drawing. Application filed December 4, 1924, Serial No. 753,986. Renewed February 2, 1932.

This invention relates to a method of canning corn and has particularly to do with the processing of the corn after it has been placed in the permanent container and sealed therein.

When canned corn reaches the hands of the jobbing trade one of the tests for quality is a test that appeals to the eye.

A can of corn freshly opened, to be of the highest visual quality, should present a light creamy color. All canners strive to get and maintain this color in their pack.

If the freshly opened can presents a brownish tinge or any shade darker than a light cream color it may not pass for the highest visual quality if there happens to be corn of a lighter color at hand with which to compare it.

Under the ordinary and regular methods of processing corn it is almost impossible to hold the light color throughout the can on account of the high temperatures and time required to properly sterilize the pack.

It is the usual practice to place the sealed cans in crates and then place the crates in suitable retorts wherein the corn is processed for about 70 minutes under a steam pressure giving about 250° F. of heat.

This heat and time has been found necessary in order to drive sufficient heat to the center of the can to insure proper sterilization of the corn in the center. In doing this, however, the outer layers of corn are overheated with the result that these layers become unduly colored and under certain conditions approach what might be termed slightly scorched.

In order to then procure a uniform color throughout the can, the darker outer layers must be thoroughly mixed with the center parts of the can which is of a much lighter color. This mixing is usually done just before the corn is shipped from the cannery or storehouse by placing the cases of corn into what is called a shaking machine or agitator. After this shaking the color will be much improved and will be substantially uniform throughout the can, but will still be of a darker shade than is sometimes desired.

I have discovered through exhaustive experiments that if corn is processed in a receding temperature that the much desired creamy color is produced throughout the can during the processing; the containers are subjected to less strain from internal pressures; the seams are less expanded and a general all around better processing and sterilization is obtained.

It is therefore an object of this invention to provide a method of processing corn wherein the processing temperatures are reduced during the necessary time to effect thorough sterilization; to impart a much better color to the finished product and to relieve in a measure the usual excessive strains to which the containers are subjected as well as eliminate the after operation of shaking the cases of corn before shipment.

With such objects in view as well as other advantages that may be inherent in the invention, consisting in the steps hereinafter set forth and claimed, it is understood that the several necessary steps to carry out the concept of the invention may be varied from the exact order mentioned without departing from the scope and nature of the invention.

In the carrying out of my improved method of processing corn the prepared corn is placed in the ordinary containers used for this purpose and handled in the ordinary manner up to the point of sterilization by heat. At this point my method comes into play and is carried out in substantially the following manner.

I will describe my improved method of processing corn as applied to what is commercially known as the continuous cooking process. It is to be understood, however that it is equally applicable to the retort method of handling the corn or any other method that may be in use.

My improved method differs from all of the usual processing practices in that I start the processing at a higher temperature than is standard practice and end the processing at a much lower temperture than it was started at and find that I get proper sterilization with less time.

My starting temperature is around 260° F. instead of the regular 250° F. and my ending temperature is around 212° F. to 225° F.

In between these two temperatures I may regulate the scale as may be necessary or desirable to produce any certain results in the finished pack. I may maintain the 260° F. temperature for a matter of 30 minutes and then reduce it to around 212° F. or 220° F. for another 25 minutes, thus getting proper sterilization in 55 minutes as against 70 minutes for the regular practice and producing a beautifully colored product that needs no after manipulation to distribute the varying colors of the pack due to the ordinary high temperatures and longer time.

If I want to employ a gradually receding temperature during the entire time of the processing period I will employ some one of the continuous cookers and provide it with suitable partitions and by-passes so the cans will automatically pass from one compartment to another of less pressure and may thereby graduate the pressures from 260° F. or thereabouts down to 212° F. or thereabouts which will give a gradual receding temperature to the contents of each can as it will not immediately drop in temperature when passing into a compartment of a lower temperature but will pass through what may be termed a cooling process. The first compartment carrying the 260° F. temperature should of course be of sufficient extent to permit the contents of each can to become sufficiently heated to insure proper sterilization.

My experiments have demonstrated that by subjecting the corn to the higher initial pressure and ending the sterilization at a much lower temperature gives proper sterilization and prevents the discoloring of the outer layers of the corn in the can and goes to disprove the theory that the corn must be subjected to a high temperature for the entire period of sterilization.

My improved process therefore, saves much time in the processing of an entire pack of corn and saves considerable expense attached thereto as the maintaining a steam pressure for a temperature of 250° F. for the entire period of 70 minutes cost more than maintaining a pressure for temperatures around 260° F. for a short period and then reducing the pressure and temperature for the rest of the sterilization period, and I save the entire expense of shaking the corn for the distribution of color before shipment.

My process of cooking corn under reduced temperatures seems to produce a kind of sweating action in the can that helps materially in proper sterilization and maintains more nearly the natural color of the corn, and of course since there is no scorching effect the taste is necessarily improved.

While I have referred particularly to corn in this description I wish it understood that the process in applicable to any food product that requires sterilization under pressure.

Having thus described my invention what I claim as new and desire to secure by Letters Patent is:

1. The method of processing corn in sealed containers consisting in subjecting the containers to a temperature of approximately 260° F. for a part of the processing time and then subjecting the containers to a receding temperature during the balance of the processing time.

2. The method of processing corn in sealed containers consisting in subjecting the containers to a temperature of approximately 260° F. for a part of the processing time and then subjecting the containers to a temperature of 212° F. to 225° F. for the balance of the processing time.

OGDEN S. SELLS.